(12) United States Patent
Phelizot

(10) Patent No.: US 6,431,332 B1
(45) Date of Patent: Aug. 13, 2002

(54) GAS SPRING INCORPORATING A SAFETY MEMBER

(75) Inventor: Jacques Phelizot, Ancerville (FR)

(73) Assignee: Orflam Industries, Saint Dizier (FR)

( * ) Notice: Subject to any disclaimer, the term of this patent is extended or adjusted under 35 U.S.C. 154(b) by 0 days.

(21) Appl. No.: 09/559,910

(22) Filed: Apr. 28, 2000

(51) Int. Cl.[7] .................................................. F16F 7/12
(52) U.S. Cl. ...................................... 188/376; 188/286
(58) Field of Search ............................... 188/371, 374, 188/376, 377, 286; 267/116, 118, 64.28; 293/107, 132, 133, 134

(56) References Cited

U.S. PATENT DOCUMENTS 5,735,371 A   4/1998   Jobelius et al.

FOREIGN PATENT DOCUMENTS

| EP | A1 0 427 468 | 6/1991 |
|---|---|---|
| EP | A2 0 490 386 | 6/1992 |

OTHER PUBLICATIONS

Quiri 500 80 verins tous usages . . . de 6 a 500 tonnes.

Commande et Asservissement Hydrauliques verins hydrauliques, Robert Affouard.

Patent Abstracts of Japan, vol. 8, No. 170, Aug. 7, 1984 (JP 59–065609).

*Primary Examiner*—Jack Lavinder
*Assistant Examiner*—Melanie Torres
(74) *Attorney, Agent, or Firm*—Oliff & Berridge, PLC

(57) ABSTRACT

The invention relates to a compressible-fluid device such as a gas spring, including a compression chamber (3) and a piston (4) that is movable in said chamber. It includes a safety member (21) disposed so as to be struck by the piston (4) in the event of the stroke of said piston being greater than a predetermined nominal stroke. The safety member (21) is arranged so as to cause the compression chamber (3) to be drained when said safety member is struck by the piston.

31 Claims, 4 Drawing Sheets

FIG_1

FIG_2

FIG_3

GAS SPRING INCORPORATING A SAFETY MEMBER

The present invention relates to a compressible-fluid device of the type including a compression chamber designed to be filled with a compressible fluid, and a piston that is movable in said chamber so as to compress the fluid contained therein.

The fluid which is compressed by the piston exerts a return force on said piston, and when the fluid used is a gas, such a device is also referred to as a gas spring.

The piston includes a rod which slides in a bore of a guide member also referred to as a cartridge, and the rod is provided, at its end situated in the compression chamber, with a collar which at rest comes into abutment against the guide member.

In the event of an accidental stroke of the piston beyond its nominal stroke, the collar is capable of striking the bottom of the compression chamber and of breaking, in which event it no longer performs its function of retaining the rod, and said rod is thus violently projected out of the spring by the pressure of the gas present in the compression chamber, with the risk of causing material and/or bodily damage.

The invention seeks to remedy that problem.

This is achieved by the fact that the compressible-fluid device includes a safety member disposed so as to be struck by the piston in the event of the stroke of said piston being greater than a predetermined nominal stroke, and by the fact that said safety member is arranged so as to cause the compression chamber to be drained when said safety member is struck by the piston.

As a result of the invention, the rod is not violently expelled from the device in the event of the piston impacting against the bottom of the compression chamber with consequent damage to the piston.

In a particular embodiment of the invention, the safety member has a portion with a predetermined breaking force.

Still in a particular embodiment, the safety member projects into the bottom of the compression chamber, preferably by at least 3 mm.

It can be advantageous to secure the safety member to a plug screwed into the body of the spring, said plug serving to test the resistance of the spring to the pressure, and serving to empty the compression chamber at the end of spring use.

When the piston includes a rod having a bottom end provided with a collar, the safety member is advantageously disposed so as to be struck by the collar in a location that is closer to the axis of the rod than to its periphery.

The piston stroke from which said piston strikes the safety member and causes the compression chamber to be drained is preferably at least 2 mm greater than its nominal stroke.

The invention will be better understood on reading the following detailed description of a non-limiting embodiment, and on examining the accompanying drawings in which.

Figure 1:
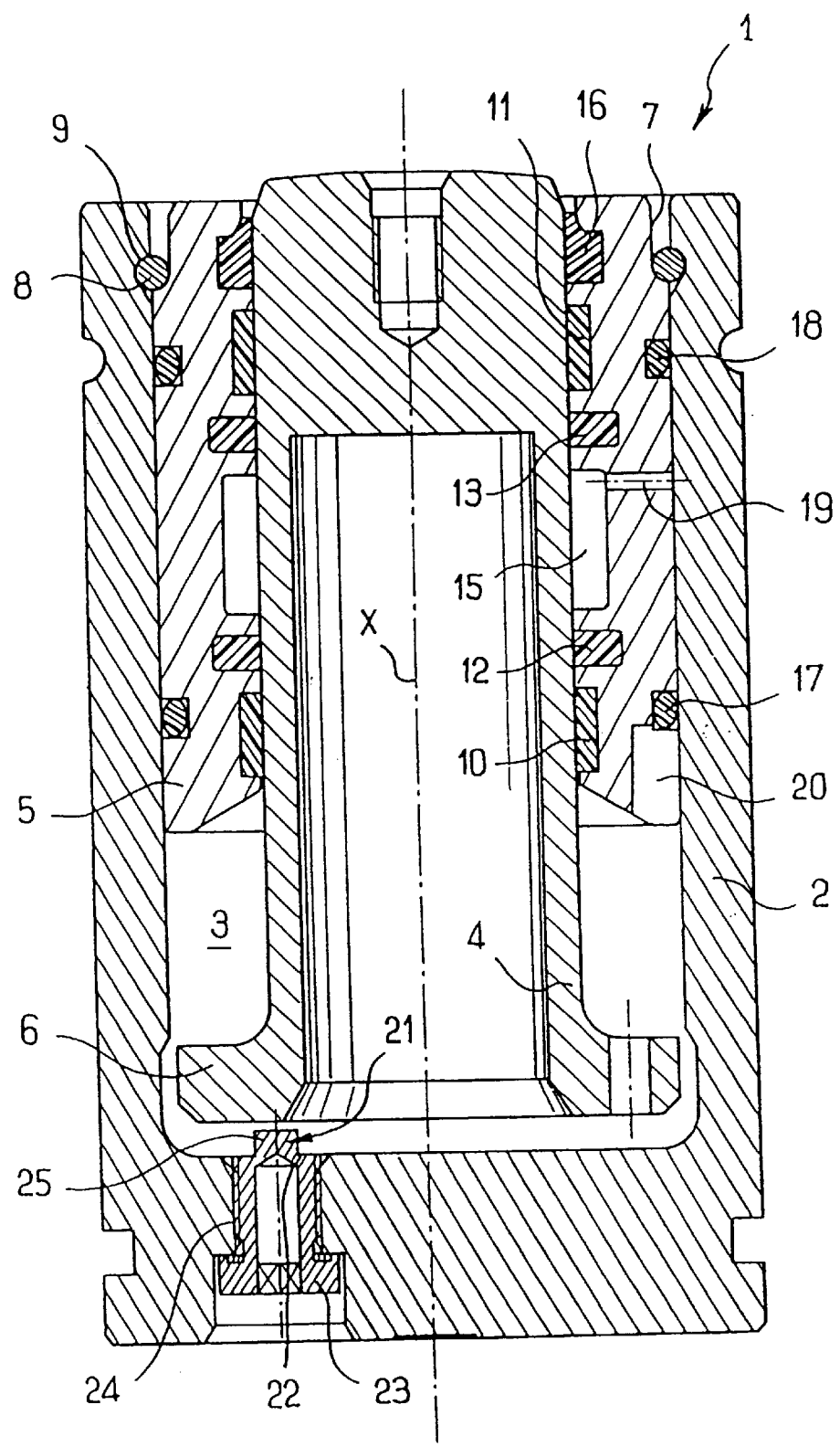
FIG. 1 is a diagrammatic section view of a gas spring of the invention, the piston being shown at the end of its nominal stroke.

The gas spring 1 shown in the figures includes a metal casing 2 in the shape of a hollow cylinder that is closed at its bottom end and that is open at its top end, defining a compression chamber 3 containing a movable one-piece piston 4 having a rod of longitudinal axis X that slides in a bore made in a guide member 5 that is inserted in the opening of the casing 2.

At its bottom end, the rod of the piston 4 has a collar 6 which, at rest, comes into abutment against the guide member 5 so as to retain the piston 4 in the gas spring.

The guide member 5 is retained in the casing 2 by an annular metal retaining ring 8 which comes into abutment firstly against an annular recess 7 of the guide member 5 and secondly against an annular groove 9 made in the proximity of the top end of the casing 2.

Guide segments 10 and 11 and successive sealing elements 12 and 13 are housed, in manner known per se, in the guide member and they bear on the piston rod.

The sealing elements 12 and 13 can be constituted by composite gaskets, for example, and between them they define an annular lubrication chamber 15 that is filled with a lubricant.

A wiper-ring 16 is housed in the top portion of the guide member 5.

Two O-rings 17 and 18 are interposed in sealed manner between the guide member 5 and the casing 2.

An axial recess 20 having a depth that is greater than the depth of the groove housing the gasket 17 and that is adjacent to the compression chamber 3 enables said gasket to deform when the pressure existing in the assembly clearance between the guide member 5 and the casing 2 between the gaskets 17 and 18 is greater than the pressure existing in the compression chamber.

A radial bore 19 opening out at one end into the lubrication chamber 15 and at the other end to the periphery of the guide member between the gaskets 17 and 18 enables the lubrication chamber 15 to be automatically drained at the end of spring use and once the compression chamber is emptied, due to the fact that the O-ring 17 ceases to be sealed when it is engaged in the above-mentioned axial recess 20.

In the invention, a safety member 21 is disposed so as to be struck by the piston 4 when the stroke of said piston exceeds a predetermined nominal stroke.

In the example described, the safety member 21 includes a central pin 25 that projects 3 mm into the bottom of the compression chamber, and a thin annular portion 22 connecting said pin 25 to a hollow plug 23 that is screwed into a bore 24 of the casing 2.

Unscrewing the plug 23 enables the compression chamber to be drained.

The mechanical strength of the thin annular portion 22 is chosen so that said portion breaks when the pin 25 is struck by the piston 4.

Figure 2:
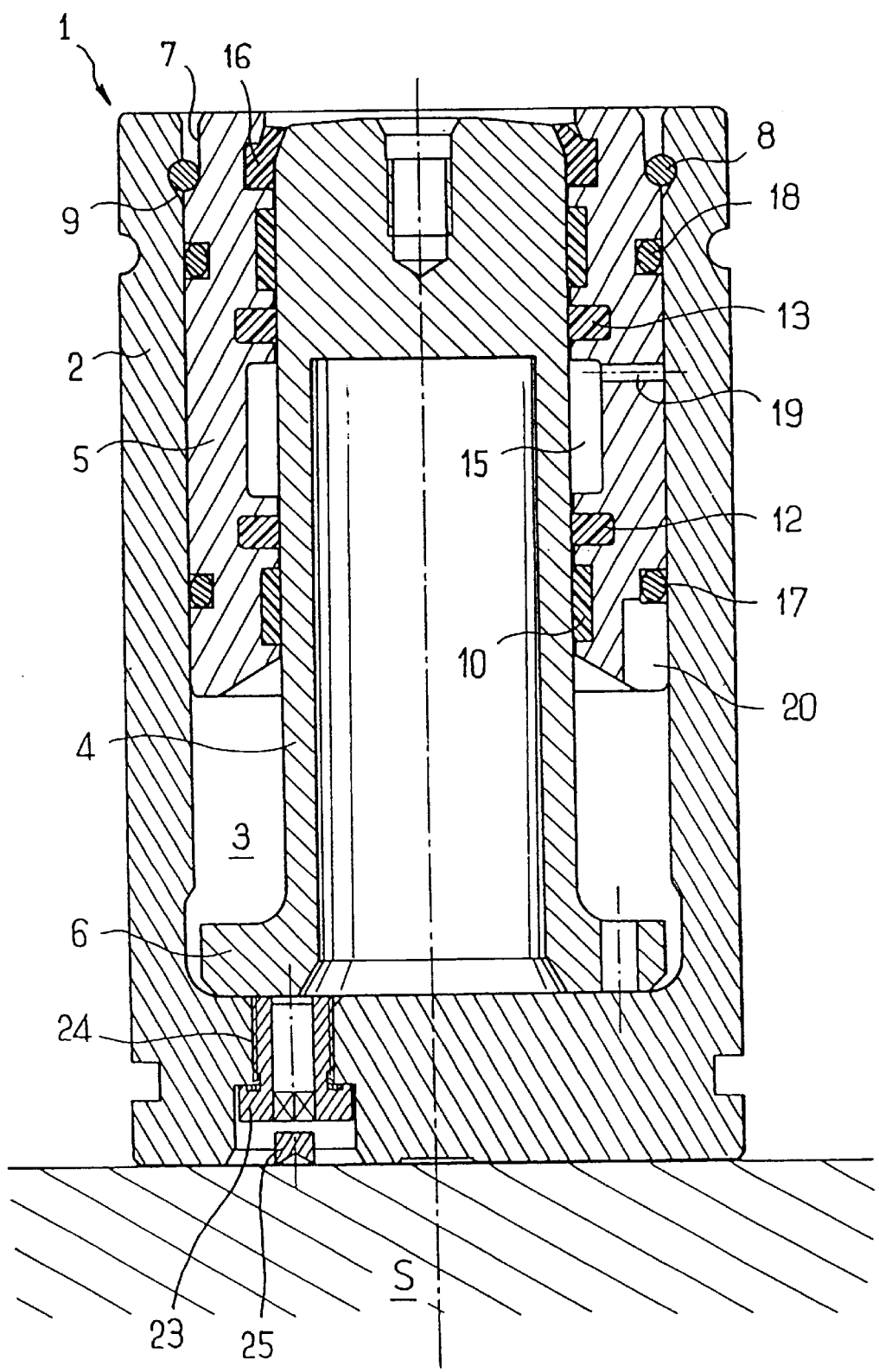
FIG. 2 is a view similar to FIG. 1, the piston being shown in abutment against the bottom of the compression chamber.

In the event of the stroke of the piston 4 being sufficient to cause said piston to come into abutment against the bottom of the compression chamber 3, as shown in FIG. 2, the collar 6 strikes the pin 25 at a point that is relatively close to the axis X and pushes the pin into the plug 23 after breaking the thin annular portion 22.

The pin 25 is thus expelled through the hollow plug 23 and the compression chamber 3 can be emptied.

This ensure that, in the event the collar 6 breaks under the effect of metal fatigue, the pressure existing in the compression chamber 3 is not sufficient to expel the rod 4 out from the spring.

In the example under consideration, it is assumed that the spring rests on a stand S so that the pin 25 is projected thereagainst.

When this is not the case, a plate can be fixed, e.g. by bolting, onto the bottom end of the casing 2, against which plate the pin 25 is projected.

The plate thus ensures the function of a protective screen against the expulsion of the pin 25 through the plug 23.

Naturally, the invention is not limited to the embodiment described above.

In particular, the shape and/or the type of safety member and other elements of the spring can be modified without going beyond the ambit of the present invention.

Figure 3:
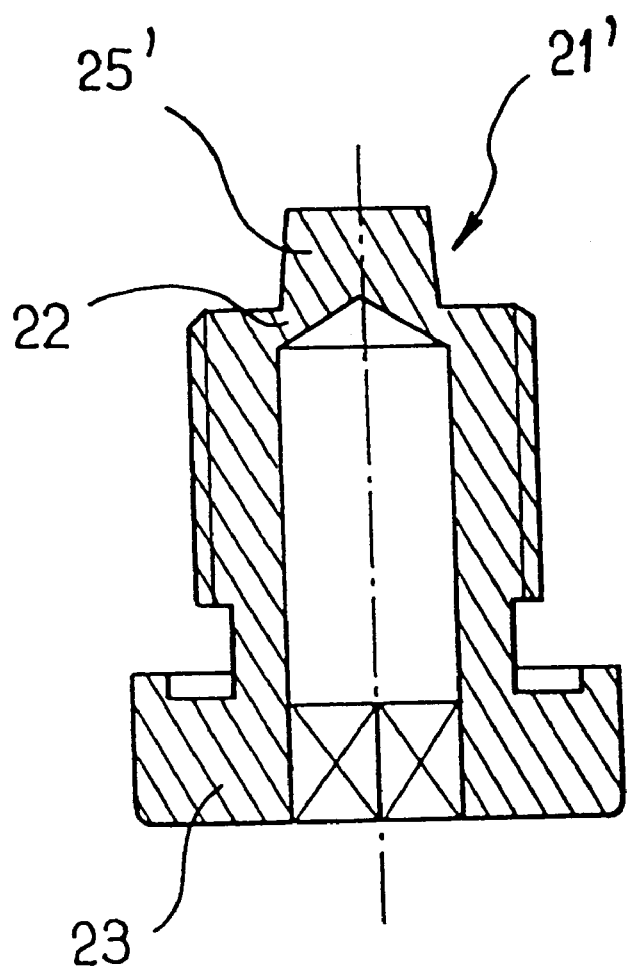
FIG. 3 shows a variant embodiment of the safety member.

FIG. 3 shows a variant embodiment of the safety member.

The safety member 21' shown in FIG. 3 differs from that shown in FIG. 1 by the fact that the central pin 25' tapers instead of being circularly cylindrical.

As a result of the slight tapering of the pin 25' towards the inside of the spring, expulsion of the pin through the plug 23 is facilitated.

Figure 4:
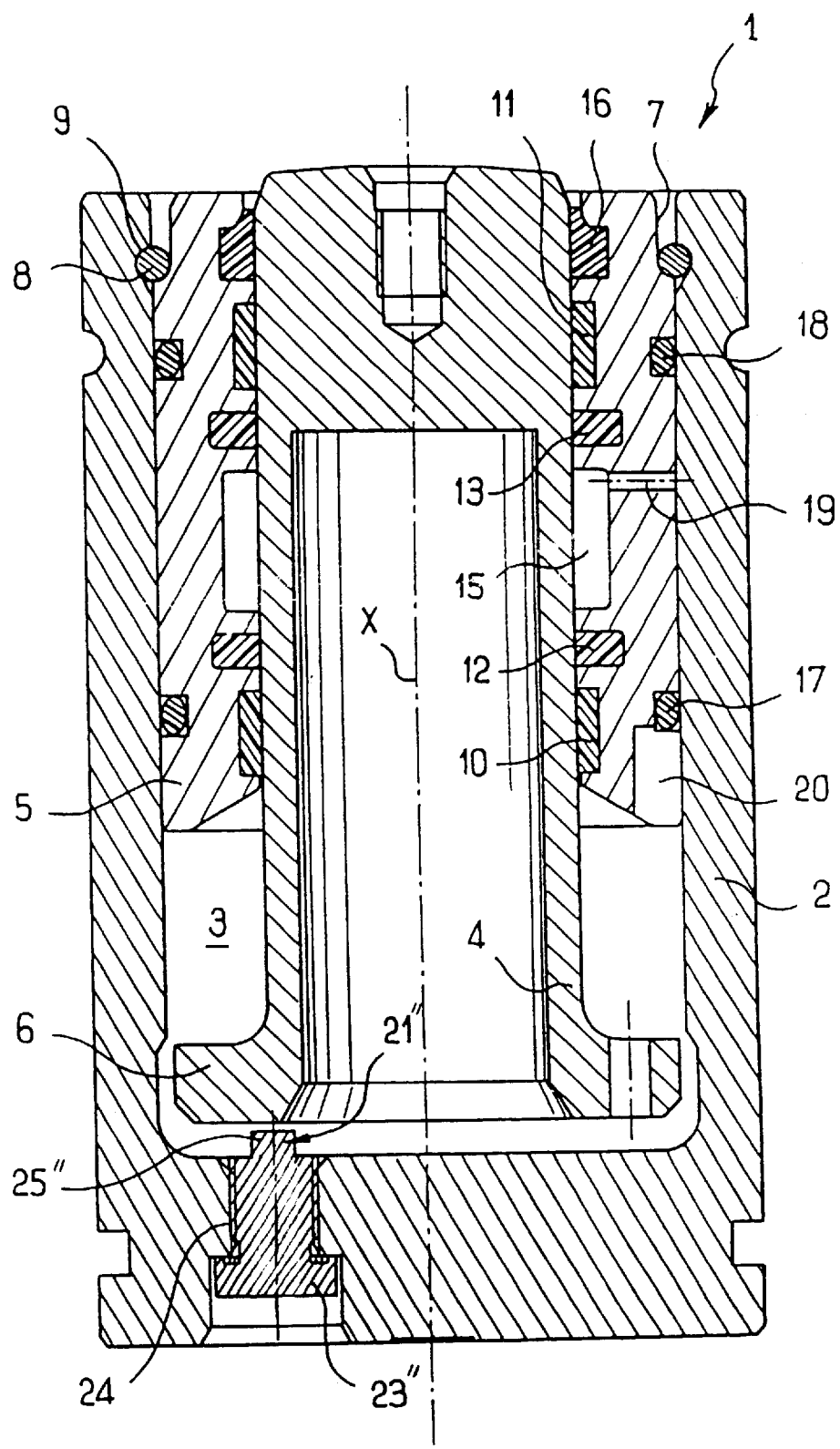
FIG. 4 shows another variant embodiment of the safety member.

In a variant shown in FIG. 4, the safety member 21" is constituted by a solid plug 23" fixed in a bore 24 in the body of the spring 1, said plug 23" being threaded, for example, and screwed into said bore 24, and having an inside end 25" that is arranged to be struck by the piston 4 when the stroke of said piston 4 exceeds a predetermined nominal stroke. The plug 23" is arranged so as to be freed from the bore 24 when it is struck by the piston 4, by destroying the threads of the plug 23" and of the bore 24 and of the casing 2, said threads having a predetermined breaking force.

I claim:

1. A compressible-fluid device, including a compression chamber containing a compressible fluid and a piston that is movable in said compression chamber in a first direction for compressing said compressible fluid and in a second direction opposite the first direction in response to a force of compressed fluid, the device comprising a safety member disposed so as to be struck by the piston in the event of an accidental stroke of said piston being greater than a predetermined nominal stroke, said safety member being arranged so as to cause the compression chamber to be drained when said safety member is struck by the piston.

2. A device according to claim 1, wherein said safety member has a portion with a predetermined breaking force.

3. A device according to claim 1 or 2, wherein said safety member projects into the bottom of the compression chamber.

4. A device according to claim 1, wherein the safety member is constituted by a solid plug fixed in a bore in a body of the device.

5. A device according to claim 1 wherein the piston includes a rod having a bottom end provided with a collar, and the safety member is disposed so as to be struck by the collar in a location that is closer to an axis of the rod than to its periphery.

6. A device according to claim 1, wherein the piston is made in one piece.

7. A device according to claim 1, wherein a the piston stroke from which said piston strikes the safety member and causes the compression chamber to be drained is at least 2 mm greater than its nominal stroke.

8. A device according to claim 1, wherein said safety member projects into the bottom of the compression chamber by at least 3 mm.

9. A compressible-fluid device, including a compression chamber and a piston that is movable in said chamber, the device comprising a safety member disposed so as to be struck by the piston in the event of a stroke of said piston being greater than a predetermined nominal stroke, said safety member being arranged so as to cause the compression chamber to be drained when said safety member is struck by the piston, said safety member being secured to a hollow plug screwed into a body of the device.

10. A device according to claim 9, wherein the safety member includes a central pin connected via a thin annular portion to said plug.

11. A device according to claim 10, wherein the central pin is tapered.

12. A device according to claim 10, further comprising a plate fastened onto a body of the device so as to constitute a protective screen against the expulsion of the pin through said plug.

13. A device according to claim 1, wherein the device further comprises a body and the safety member comprises a threaded plug screwed into a bore in the body, the plug being disposed so as to be struck by the piston in the event of the stroke of said piston being greater than a predetermined nominal stroke and being arranged so as to cause the compression chamber to be drained when said safety member is struck by the piston.

14. A compressible-fluid device including a compression chamber and a piston that is movable in said chamber, the device comprising a body, a threaded plug screwed into a bore in said body disposed so as to be struck by the piston in the event of the stroke of said piston being greater than a predetermined nominal stroke, said plug being arranged so as to cause the compression chamber to be d rained when said safety member is struck by the piston, and a protective screen is fastened onto said body of the device.

15. A gas spring including a chamber containing a gas and a piston that is movable in said chamber to compress said gas, wherein a safety member is disposed so as to be struck by the piston in the event of a stroke of said piston being greater than a predetermined nominal stroke, said safety member being arranged so as to cause the gas contained in said chamber to be drained when said safety member is accidentally struck by the piston.

16. A gas spring according to claim 15, wherein said safety member has a portion with a predetermined breaking force.

17. A gas spring according to claim 15, wherein said safety member projects into the bottom of the chamber.

18. A gas spring according to claim 15, wherein said safety member is secured to a hollow plug screwed into a body of said gas spring.

19. A gas spring according to claim 18, wherein the safety member includes a central pin connected via a thin annular portion to said plug.

20. A gas spring according to claim 19, wherein the central pin is tapered.

21. A gas spring according to claim 19, further comprising a protective screen fastened onto a body of the gas spring so as to protect against the expulsion of the pin through said plug.

22. A gas spring according to claim 15, wherein the safety member is constituted by a solid plug fixed in a bore in a body of the gas spring.

23. A gas spring according to claim 15, wherein the piston includes a rod having a bottom end provided with a collar, and wherein the safety member is disposed so as to be struck by the collar in a location that is closer to an axis of the rod that to its periphery.

24. A gas spring according to claim 15, wherein the piston is made in one piece.

25. A gas spring according to claim 15, wherein a piston stroke from which said piston strikes the safety member and causes the chamber to be drained is at least 2 mm greater than said predetermined nominal stroke.

26. A gas spring according to claim 15, wherein said safety member projects into the bottom of the chamber by at least 3 mm.

27. A gas spring including a chamber filled with a gas and a piston that is movable in said chamber to compress said gas, a casing and a plug screwed in a bore of said casing, said plug being disposed so as to be struck by the piston in the event of a stroke of said piston being greater than a predetermined nominal stroke, said plug being arranged so as to cause the gas contained in said chamber to be drained when said safety member is struck by the piston.

28. A compressible-fluid device, including a casing, a compression chamber containing a compressible fluid and a piston that is movable in said compression chamber in a first direction for compressing said compressible fluid and in a second direction opposite the first direction in response to a force of compressed fluid, the device comprising a safety member disposed in a through bore of the casing so as to be struck by the piston in the event of stroke of said piston being greater than a predetermined nominal stroke, said safety member being arranged so as to cause the compression chamber to be drained when said safety member is struck by the piston.

29. A compressible-fluid device, including a compression chamber containing a compressible fluid and a piston that is movable in said compression chamber in a first direction for compressing said compressible fluid and in a second direction opposite the first direction in response to a force of compressed fluid, the device comprising a safety member disposed so as to be struck by the piston in the event of a stroke of said piston being greater than a predetermined nominal stroke, said safety member being arranged so as to cause the compression chamber to be drained when said safety member is struck by the piston, the piston having a face facing the safety member, said face being provided with a central recess.

30. A compressible-fluid device, including a compression chamber containing a compressible fluid and a piston that is movable in said compression chamber in a first direction for compressing said compressible fluid and in a second direction opposite the first direction in response to a force of compressed fluid, the device comprising a safety member disposed so as to be struck by the piston in the event of a stroke of said piston being greater than a predetermined nominal stroke, said safety member being arranged so as to break when struck by the piston so as to cause the compression chamber to be drained.

31. A compressible-fluid device, including a casing, a compression chamber containing a compressible fluid and a piston that is movable in said compression chamber in a first direction for compressing said compressible fluid and in a second direction opposite the first direction in response to a force of compressed fluid, the device comprising a safety member rigidly fixed on said casing and disposed so as to be struck by the piston in the event of a stroke of said piston being greater than a predetermined nominal stroke, said safety member being arranged so as to cause the compression chamber to be drained when said safety member is struck by the piston.

* * * * *